July 21, 1970 SHINTARO OSHIMA ET AL 3,521,252

MAGNETIC MEMORY ELEMENT HAVING TWO THIN FILMS OF DIFFERING COERCIVE FORCE

Filed Aug. 9, 1966 2 Sheets-Sheet 1

United States Patent Office 3,521,252

Patented July 21, 1970

3,521,252

MAGNETIC MEMORY ELEMENT HAVING TWO THIN FILMS OF DIFFERING COERCIVE FORCE

Shintaro Oshima, Musashino-shi, Tokyo-to, and Kitsutaro Amano, Sagamihara-shi, Japan, assignors to Kokusai Denshin Denwa Kabushiki Kaisha, Chiyoda-ku, Tokyo-to, Japan Filed Aug. 9, 1966, Ser. No. 571,274
Claims priority, application Japan, Aug. 16, 1965, 40/49,566
Int. Cl. G11c *11/14*
U.S. Cl. 340—174 6 Claims

ABSTRACT OF THE DISCLOSURE

A non-destructive magnetic memory element using a first conductor with a film of ferromagnetic material and a second conductor arranged close to and insulated from the first conductor so as to be orthogonal to the first conductor, where the film of ferromagnetic material comprises two thin films, each of which is deposited on substantially half the surface of the first conductor along the lengthwise direction thereof, and which are connected serially and intimately at overlapped joints extending lengthwise of the first conductor to form a closed magnetic circuit with a low magnetic resistance, one of the two magnetic thin films having a larger coercive force than the other.

Figure 1:
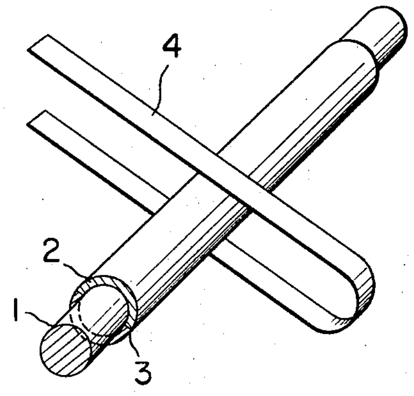

This invention relates to a magnetic memory element utilizing a thin film of ferromagnetic material, and more particularly to a magnetic memory element from which the information stored therein can be read out non-destructively.

As is well known in the art, temporal memory devices can be classified into two types, viz one in which once the information stored therein is read out, the information is destroyed and the other wherein the stored information can be read out non-destructively. In the former type, since the stored information is destroyed it is necessary to rewrite the information after it has been read out. This results in an increase of memory cycle time as well as in the complication of associated circuits. In the latter type there is no such problem, but in a conventional non-destructive type memory element utilizing a thin film of ferromagnetic material, for example in a memory element wherein a single sheet of thin film of ferromagnetic material is used, a drive conductor is disposed in intimate contact with the magnetic film in parallel to its direction of easy magnetization and an information conductor is disposed at right angles to the drive conductor, the information is read out non-destructively by rotating the direction of magnetization within a range in which it can be restored to the original direction of magnetization while the drive current is maintained at a value less than a predetermined constant value during read out operation of the information. As a result, the read out voltage is low and if the drive current is increased to obtain a large read out voltage, the direction of magnetization would be reversed, thus causing unstable operation.

It is therefore an object of this invention to provide a novel magnetic memory element which can operate very stably, can read out non-destructively the stored information with a large read out voltage, and can be easily manufactured.

The magnetic memory element according to this invention comprises a first conductor, a second conductor and two thin films of magnetic material each of which is deposited on substantially half of the surface of the first conductor along the lengthwise direction thereof. The two thin films of magnetic material are connected in series and intimately at overlapped joints extending lengthwise of the first conductor to form a closed magnetic circuit with a low magnetic resistance one of the said thin films having a larger coercive force than the other. The direction of easy magnetization of each film is substantially parallel to the direction of said closed magnetic circuit and the second conductor is electrically insulated from the first conductor and is disposed substantially at right angles thereto to complete a magnetic memory element. To write in the information, at first a drive current is passed through the second conductor and then a binary information to be stored is applied to the first conductor to magnetize the magnetic film of large coercive force in either one of two directions depending upon application of the binary information to be stored. To read out the stored information, a read out drive current is passed through the second conductor so as to energize the magnetic film of small coercive force whereby an output signal having either one of two polarities corresponding to the stored binary information is read out stably and non-destructively from the first conductor.

Figure 4:
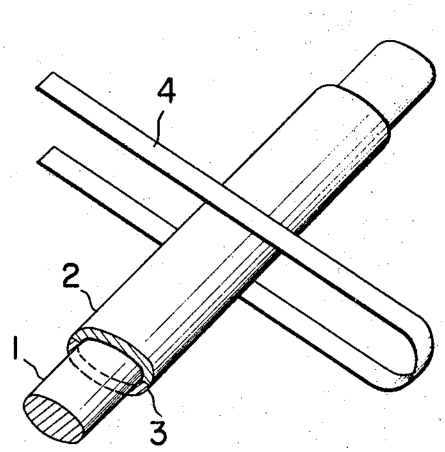
Figure 5:
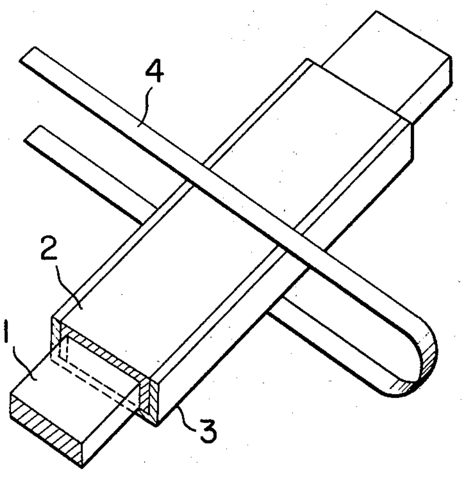

The novel features of this invention are set forth with particularity in the appended claims, this invention, however, both as to its construction and operation together with further objects and advantages thereof, may best be understood by reference to the following description taken in connection with the accompanying drawings, in which like or equivalent parts are designated by the same reference characters, and in which:

FIG. 1 is a perspective view illustrating the construction of one embodiment of the novel magnetic memory element according to this invention;

FIGS. 2*a*, 2*b*, 2*c* and 2*d* show hysteresis characteristics of two magnetic films deposited on a first conductor of the magnetic memory element embodying this invention;

FIGS. 3*a*, 3*b*, 3*c* and 3*d* are waveforms helpful to explain the operation of the novel magnetic memory element;

FIG. 4 is a perspective view of a modified magnetic memory element according to this invention; and FIG. 5 is a perspective view of another modification of the novel magnetic memory element according to this invention.

Figure 2A:
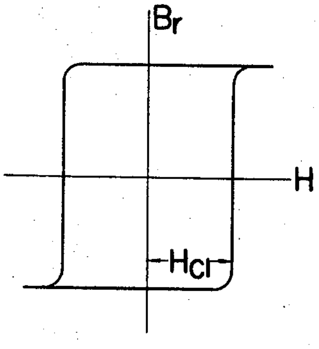

Referring now to the accompanying drawings, the magnetic memory element shown in FIG. 1 comprises a first conductor 1, two magnetic films 2 and 3 deposited on the surface of the conductor by electrolytic deposition or vacuum evaporation technique. The first conductor 1 serves as a substrate for depositing thereon the magnetic films by electrolytic deposition or vacuum evaporation technique and consist of a copper wire or Phosphor bronze wire having substantially circular cross-section. The magnetic film 2 is the first ferromagnetic film which is deposited on substantially half of the surface area of the conductor 1 along its lengthwise direction. This film 2 has its direction of easy magnetization in the circumferential direction and as shown in FIG. 2*a* its coercive force $Hc_1$ is relatively large, about 10 oersteds, for instance. On the other hand, the magnetic film 3 consists of a second magnetic film which is deposited upon the remaining half of the surface area of the first conductor 1. Like the first magnetic film 2, the direction of easy magnetization of the film 3 is in the circumferential direction, but as shown in FIG. 2*b*, its coercive force $Hc_2$ is substantially smaller than the coercive force $Hc_1$ of the magnetic film 2, 2 to 3 oersteds, for example.

Figure 2C:
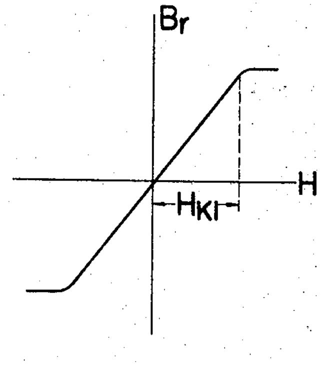
Figure 2B:
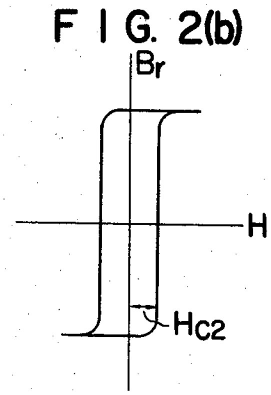
Figure 2D:
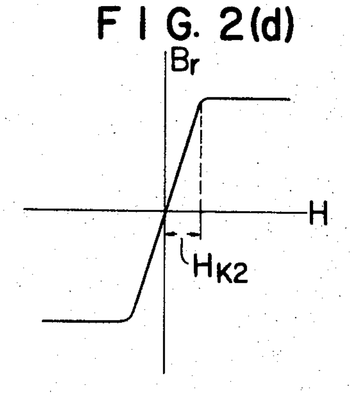

FIGS. 2*a* and 2*b* show hysteresis characteristics respectively of the first and second magnetic films 2 and 3 when observed in their directions of easy magnetization, whereas FIGS. 2*c* and 2*d* show their hysteresis characteristics when observed in their directions of difficult magnetization. In these figures, the magnitudes of the saturated magnetic fields are represented by $Hk_1$ and $Hk_2$, respectively. It is desirable that the joints between the first and second magnetic films 2 and 3 are in physically intimate contact so that these magnetic films contact with each other to such an extent as to serially and magnetically connect the two magnetic films 2 and 3 to form a closed magnetic path of low magnetic resistance in the circumferential direction. As shown in FIG. 1, a second conductor 4 is disposed at right angles and closely adjacent to the first conductor. When a electric current is passed through the second conductor 4 to magnetize the memory element of the magnetic films formed at the cross between the first and second conductors in the clockwise or counterclockwise direction along the circumference of the first conductor, one bit of information will be stored in the magnetic memory element.

Figure 3A:
Figure 3C:
Figure 3B:
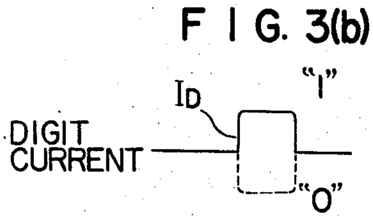

In order to store a predetermined bit of information in the memory element shown in this embodiment, at first a drive current $Iw$ shown in FIG. 3*a* is caused to flow through the second conductor 4 to produce a magnetic field larger than the saturated magnetic field $Hk_1$ of the first magnetic film 2 whereby to magnetize this film 2 in the direction of its direction of difficult magnetization and then a digit current $I_D$ which is shown in FIG. 3*b* and having a polarity corresponding to the binary information "1" or "0" to be stored is passed through the first conductor 1 thereby to bias the first magnetic film 2 in either one of the directions of its easy magnetization. Thereafter, the current $Iw$ is reduced to zero to magnetize the first magnetic film 2 in the required direction. At this time since the coercive force $Hc_2$ of the second magnetic film 3 is sufficiently smaller than the coercive force $Hc_1$ of the first magnetic film the magnetic film 3 will be magnetized in the same direction as the first magnetic film 2.

Figure 3D:
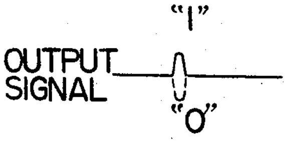

To read out the information stored in the magnetic memory element, a read out drive current $I_R$ as shown in FIG. 3*c* is passed through the second conductor 4. However, the magnitude of the magnetic field H produced by this current $I_R$ is selected to satisfy the relation $H_{k1}>H>H_{k2}$. By such selection, the second magnetic film 3 is driven along the direction of difficult magnetization to produce in the first conductor 1 an output voltage having a polarity corresponding to the direction of magnetization or the information "1" or "0" stored in the first and second magnetic films 2 and 3, as shown in FIG. 3*d*. However, as the coercive force of the first magnetic film 2 is sufficiently larger than the magnetic field H, the effect of $I_R$ is negligible. After disappearance of the drive current $I_R$, due to the residual flux in the first film 2, the magnetic film 3 again restores its original direction of magnetization so that the stored information will not be destructed by read out operation, thus providing the non-destructive read out.

While in the above embodiment the first conductor 1 was shown as having substantially circular cross-section, it is obvious that, as shown in FIGS. 4 and 5, the magnetic memory element of this invention may also comprise a first conductor 1 of substantially elliptical or rectangular cross-section and two types of magnetic thin films deposited thereon. In the embodiment shown in FIG. 4, on the surface of the first conductor 1 of elliptical cross-section are deposited the first and second magnetic films 2 and 3 by the same process as in the embodiment shown in FIG. 1. In the alternative embodiment shown in FIG. 5, on the surface of the first conductor 1 having rectangular cross-section are deposited the first and second magnetic films 2 and 3 with their joints overlapped. In the embodiments shown in FIGS. 4 and 5, the first conductor 1 is relatively flat, so that intimate contacts between the two magnetic films 2, 3 deposited on the first conductor 1 and the second conductor 2 is improved. Further, in the embodiment shown in FIG. 5, overlapped joints between two magnetic films 2 and 3 provide good magnetic connection.

In the conventional non-destructive read out type magnetic film memory element, since information is read out by rotating the direction of magnetization in a range within which the direction of magnetization is completely restorable, it is necessary that the magnetic field produced by the drive current should be sufficiently smaller than the coercive force of the magnetic film. In the magnetic memory element embodying this invention, however, it is possible to sufficiently increase the magnitude of magnetic field produced by the drive current so long as it is maintained less than the coercive force of the first magnetic film 2 having larger coercive force. Accordingly, with the novel magnetic memory element it is possible to increase the magnitude of read out drive current and hence to produce a large output voltage.

Magnetic films may be deposited on the surface of the first conductor by any well known technique such an electrolytic deposition or vacuum evaporation. For example, the portion of the surface of the first conductor 1 upon which the second magnetic film 3 is to be later deposited is covered with suitable insulating film and the first magnetic film 2 is deposited. Then, after removing the said insulating film and covering the surface of the first magnetic film 2, the second magnetic film 3 is electrolytically deposited. In this manner, the magnetic memory element of this invention can be readily manufactured by the conventional electrolytic deposition or vacuum deposition technique.

While in the above description the first magnetic film 2 has been described as having magnetic anistropy, such property is not always essential to the first magnetic film. The operation of the novel magnetic memory element is substantially identical with that of semipermanent magnetic memory element comprising the combination of a magnet and a magnetic film. More particularly, as the magnet utilized in the semipermanent magnetic memory element corresponds to the first magnetic film of high coercive force utilized in this invention, it may be considered that, according to this invention a magnet and a magnetic film are connected in series thereby enabling to electrically change the polarity of the magnet.

What we claim is:

1. A non-destructive readout magnetic memory comprising a wire first conductor; first and second films of magnetic retentive material each of which is disposed on substantially half of the surface of said first conductor along the lengthwise direction thereof; said two magnetic films being serially and intimately connected at joints extending lengthwise of said first conductor to form a closed magnetic path of low magnetic resistance around said first conductor, said first magnetic film having a higher coercive force than said second magnetic film and the directions of easy magnetization of said two magnetic films being substantially parallel with said closed magnetic path said first conductor being energized to magnetize the film of larger coercivity for writing in information to be stored, conductor means disposed substantially at right angles to said first conductor and electrically insulated therefrom energized during writing in of binary information into said first conductor and energized to non-destructively read out information stored in said first conductor by magnetization of said film of lower coercivity and developing in said conductor a readout signal of either of two polarities in dependence upon the information stored.

2. A non-destructive readout memory according to claim 1, wherein the cross-section of said first conductor is substantially circular.

3. A non-destructive readout magnetic memory according to claim 1, wherein the cross-section of said first conductor is substantially elliptical.

4. A non-destructive readout magnetic memory according to claim 1, wherein the cross-section of said first conductor is substantially rectangular.

5. A non-destructive readout magnetic memory according to claim 1, wherein the joints between said two magnetic films are overlapped.

6. In a closed-flux path non-destructive readout memory, in combination, a wire conductor having means defining a closed-flux path disposed circumferentially on the surface thereof for storing information thereof, said means defining said path comprising two films of magnetizable material of different coercive forces disposed in series in the direction of said closed path, both films physically contacting each other and both having an easy direction of magnetization in a direction of said closed flux-path, said wire conductor having applied thereto in operation current to magnetize the film of layer of larger coercive force in either of two directions in dependence upon binary information to be in said closed-flux path, and means to read in and non-destructively read out information stored in said closed-flux path comprising a second conductor electrically insulated from said wire conductor and disposed substantially at ninety degrees thereto energized in operation by read in drive current prior to and during application of said magnetization current to said wire conductor to read in said binary information and energized in operation by read out drive current to rotate the magnetization of the film of lesser coercive force to detect and read out non-destructively on said wire conductor an output signal of either of two polarities representative of said binary information and in dependence upon the binary information stored in said wire conductor.

References Cited

UNITED STATES PATENTS

| | | | |
|---|---|---|---|
| 2,805,407 | 9/1957 | Wallace | 340—174 |
| 2,911,627 | 11/1959 | Kilburn et al. | 340—174 |
| 3,067,408 | 12/1962 | Barrett | 340—174 |
| 3,264,619 | 8/1966 | Riseman et al. | 340—174 |

OTHER REFERENCES

IBM Technical Disclosure Bulletin "Magnetic Storage Device," by Bertelsen, vol. 8, #1, June 1965, pp. 148–150.

STANLEY M. URYNOWICZ, Jr., Primary Examiner